US012060919B2

(12) United States Patent
Fiorese et al.

(10) Patent No.: US 12,060,919 B2
(45) Date of Patent: Aug. 13, 2024

(54) GAS-FILLED CYLINDER WITH OVERTRAVEL SAFETY DEVICE

(71) Applicant: SPECIAL SPRINGS S.R.L., Romano d'Ezzelino (IT)

(72) Inventors: Massimo Fiorese, Bassano del Grappa (IT); Francesco Bordin, Caerano di San Marco (IT); Mattia Todesco, Valbrenta (IT)

(73) Assignee: SPECIAL SPRINGS S.R.L., Romano D'Ezzelino (IT)

( * ) Notice: Subject to any disclaimer, the term of this patent is extended or adjusted under 35 U.S.C. 154(b) by 0 days.

(21) Appl. No.: 17/503,578

(22) Filed: Oct. 18, 2021

(65) Prior Publication Data

US 2022/0120328 A1  Apr. 21, 2022

(30) Foreign Application Priority Data

Oct. 20, 2020  (IT) .......................... 102020000024685

(51) Int. Cl.
*F16F 9/02* (2006.01)
*F16F 9/32* (2006.01)

(52) U.S. Cl.
CPC .......... *F16F 9/0218* (2013.01); *F16F 9/0227* (2013.01); *F16F 9/0281* (2013.01); *F16F 9/3221* (2013.01); *F16F 9/3235* (2013.01)

(58) Field of Classification Search
CPC ...... F16F 9/0218; F16F 9/0227; F16F 9/0281; F16F 9/3221
See application file for complete search history.

(56) References Cited

U.S. PATENT DOCUMENTS

| 4,005,763 A | 2/1977 | Wallis | |
| 4,583,722 A * | 4/1986 | Wallis | F16F 9/362 |
| | | | 277/529 |
| 4,765,227 A | 8/1988 | Balazs et al. | |
| 2012/0042770 A1 | 2/2012 | Cappeller et al. | |
| 2013/0228069 A1* | 9/2013 | Cappeller | F16F 9/3242 |
| | | | 92/169.1 |
| 2015/0137435 A1* | 5/2015 | Cotter | F16F 9/435 |
| | | | 267/119 |

(Continued)

FOREIGN PATENT DOCUMENTS

| EP | 0 427 468 A1 | 5/1991 |
| EP | 0 522 373 A1 | 1/1993 |
| EP | 1221559 B1 | 6/2006 |

OTHER PUBLICATIONS

Italian Search Report and Written Opinion dated Jul. 14, 2021 issued in IT 202000024685, with partial translation.

*Primary Examiner* — Melody M Burch

(74) *Attorney, Agent, or Firm* — Scully, Scott, Murphy & Presser, P.C.

(57) ABSTRACT

A gas-filled cylinder, particularly for a damping device with single manifold, the cylinder comprising:
  a tubular jacket, closed at one end by an annular head portion,
  a rod with a piston which translates inside the jacket through the head portion, the piston being directed toward the inside of the jacket, the jacket and the piston defining a portion of an expansion/compression chamber for the gas,
  at least one sealing element between the piston and the internal surface of the jacket.
The cylinder has at least one safety hole on the internal surface of the jacket.

12 Claims, 3 Drawing Sheets

(56) References Cited

U.S. PATENT DOCUMENTS

2016/0178055 A1* 6/2016 Cappeller ............... F16F 9/435
　　　　　　　　　　　　　　　　　　　　　92/165 R
2019/0301557 A1* 10/2019 Ito ......................... F16F 9/3278

* cited by examiner

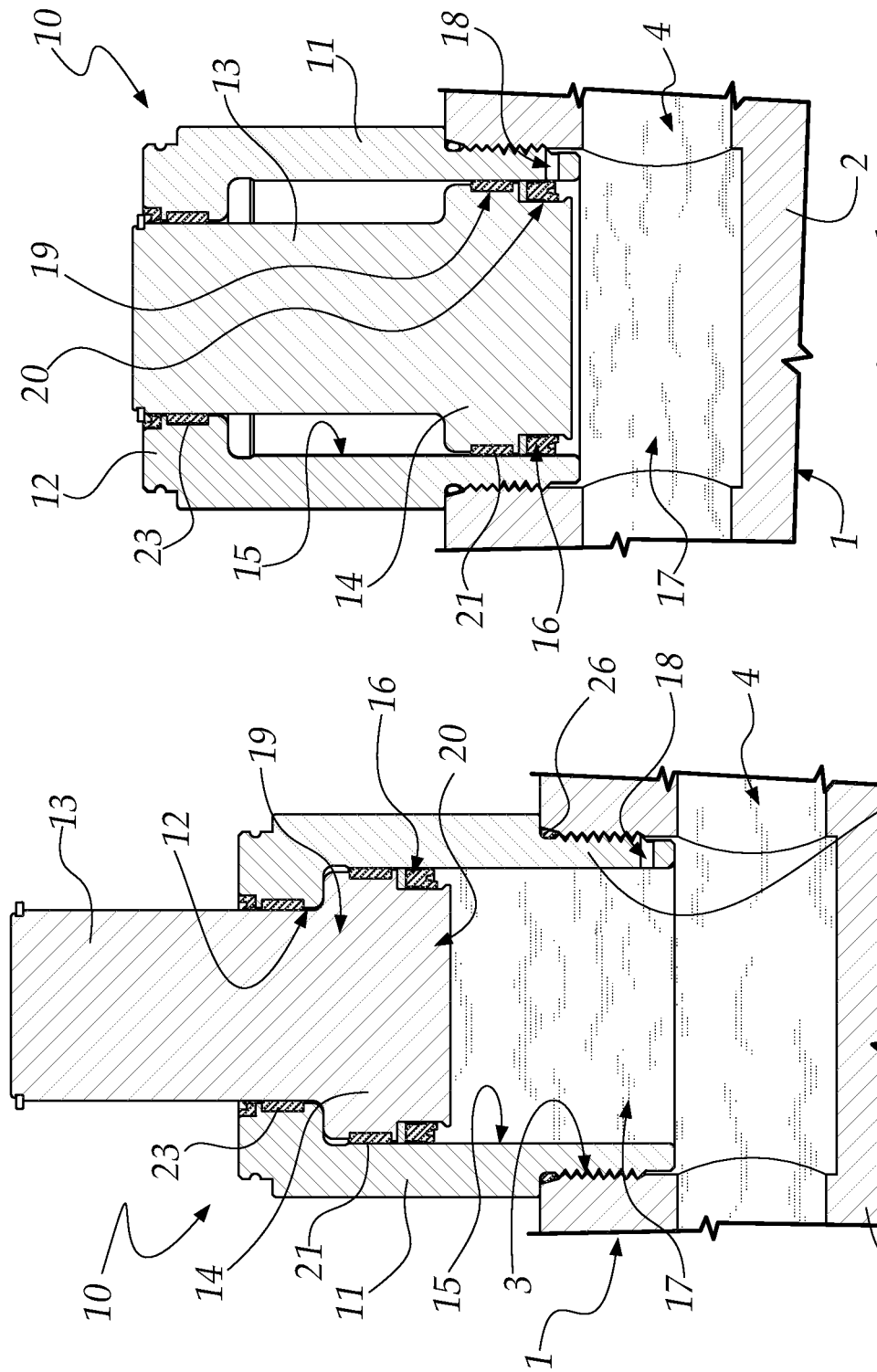

GAS-FILLED CYLINDER WITH OVERTRAVEL SAFETY DEVICE

The present invention relates to a gas-filled cylinder with an overtravel safety device.

The invention can be applied in an industrial context, for example in the field of stamping sheet metal.

In particular the invention relates to gas-filled cylinders for damping devices with single manifold.

The term "damping device with single manifold" in the present description means what in the field of gas-filled cylinders is known as a "manifold system".

Gas-filled cylinders are generally constituted by a tubular jacket containing a gas, which is closed hermetically at one end by a base or end plate, and is perforated, at the opposite end, for the passage of a rod with a piston, which translates inside the jacket.

The jacket substantially defines the travel space for the piston, while the piston, with the jacket and the base/end plate, defines the gas compression and expansion chamber.

The function of gas-filled cylinders is to return an elastic force when they are compressed.

Nowadays "manifold systems" or damping devices with single manifold are widespread.

Such devices comprise a plurality of gas-filled cylinders associated with single manifold plate that (fluidically) connects the jacket of each cylinder to a single manifold.

The manifold plate has a plurality of holes, in each one of which the jacket of a respective gas-filled cylinder is inserted/accommodated.

Basically, in damping devices with single manifold the gas-filled cylinders have no end plate, but are all closed by the same manifold plate.

These systems are usually used in equipment such as molds, stamping presses and the like.

In such applications the gas-filled cylinders can be subjected to situations of high internal pressure, or impacts with the associated parts of a press or of a mold, such that they could be damaged.

This kind of damage can render the gas-filled cylinder unusable, making its replacement necessary and therefore also the shutdown of the machine or apparatus on which it is mounted to operate, but it can also be serious enough to cause injury to an operator who happens to be in the vicinity, such as in the event of breakage owing to an uncontrolled increase in the pressure.

One of the foremost reasons that lead to such damage is what is known as 'overtravel' of the piston, i.e. a retracting stroke of the piston rod which is greater than the permitted stroke which that specific gas-filled cylinder is built to handle.

The overtravel can be caused for example by an unexpected increase of travel on the rod of the cylinder, which forces the rod to re-enter the jacket of the cylinder for a non-predetermined length, thus generating an overload inside the cylinder, or the damping device with single manifold, which cannot be sustained by the structure of the cylinder or of the device as a whole.

The cylinder can thus 'belly' or split open, or it can break at the points where the parts that constitute it are joined together, or the sealing elements can give way.

In all these cases the result can be an unexpected, unwanted, and dangerous rapid outflow of gas.

The need is therefore felt to make available a gas-filled cylinder with an overtravel safety device.

The aim of the present invention is to provide a gas-filled cylinder, particularly for a damping device with single manifold, which is capable of improving the known art in one or more of the above mentioned aspects.

Within this aim, an object of the invention is to provide a gas-filled cylinder, particularly for a damping device with single manifold, which has an overtravel safety device.

Another object of the invention is to make available a gas-filled cylinder, particularly for a damping device with single manifold, which allows a rapid discharge of the gas in the event of overtravel without causing explosions and/or injury to persons and/or damage to equipment in the vicinity.

A further object of the invention is to provide a gas-filled cylinder with an overtravel safety device that, in producing the discharge of the gas, makes the cylinder safe.

A further object of the present invention is to overcome the drawbacks of the background art in a manner that is alternative to any existing solutions.

Another object of the invention is to provide a gas-filled cylinder with an overtravel safety device that is highly reliable, easy to implement and of low cost.

This aim and these and other objects which will become better apparent hereinafter are achieved by a gas-filled cylinder, particularly for a damping device with single manifold, said cylinder comprising:
- a tubular jacket, closed at one end by an annular head portion,
- a rod with a piston which translates inside said jacket through said head portion, said piston being directed toward the inside of said jacket, said jacket and said piston defining a portion of an expansion/compression chamber for said gas,
- at least one sealing element between said piston and the internal surface of said jacket,
- said cylinder being characterized in that it has at least one safety hole on said internal surface of said jacket.

Further characteristics and advantages of the invention will become better apparent from the description of a preferred, but not exclusive, embodiment of the gas-filled cylinder according to the invention, which is illustrated by way of non-limiting example in the accompanying drawings wherein:

FIG. 4a is a cross-sectional view of a gas-filled cylinder, according to the invention, in an application, in a first configuration;

FIG. 4b is a cross-sectional view of a gas-filled cylinder, according to the invention, in an application, in a second configuration, of overtravel;

Figure 1:
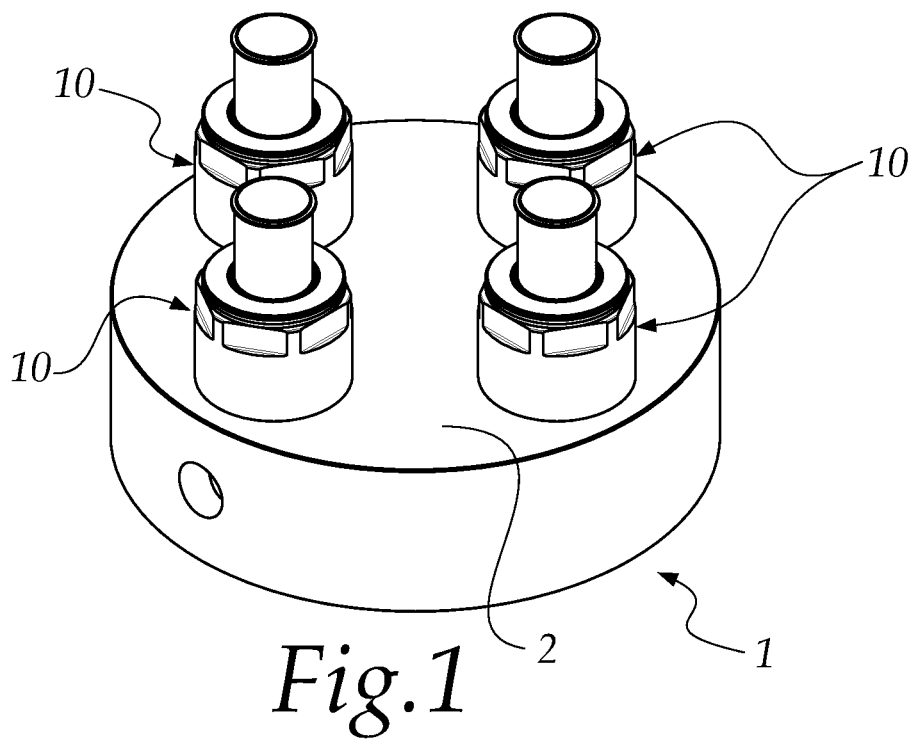
FIG. 1 is a perspective view of a damping device with single manifold with a plurality of gas-filled cylinders according to the invention.
Figure 2:
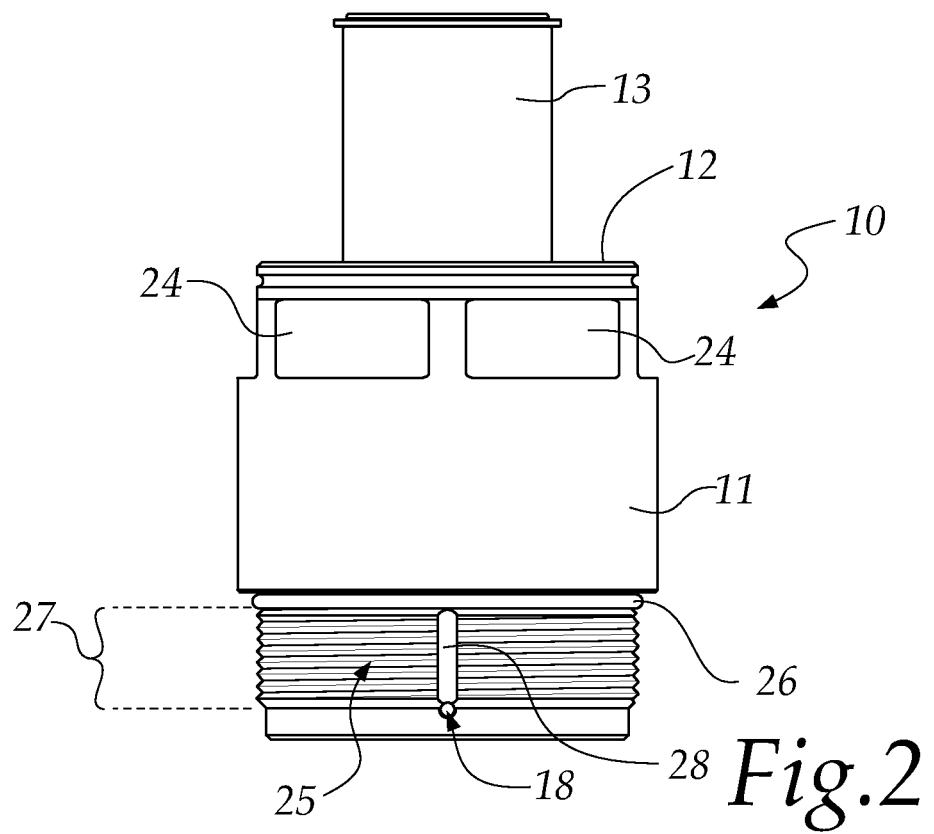
FIG. 2 is a side view of a gas-filled cylinder, according to the invention, in a first configuration.
Figure 3:
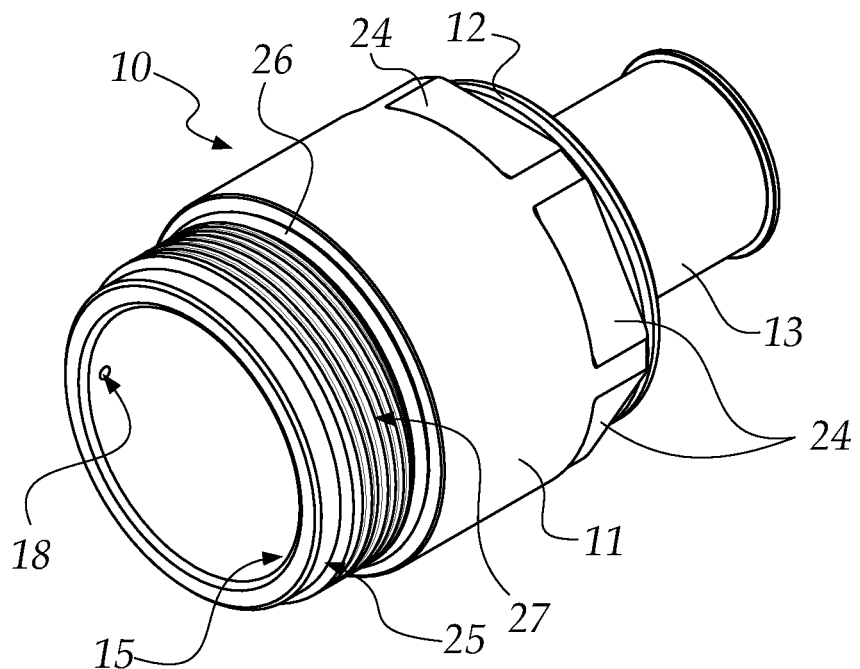
FIG. 3 is a perspective view of the gas-filled cylinder of FIG. 2.

With reference to the figures, a cylinder according to the invention, particularly for damping devices with single manifold, is generally designated by the reference numeral 10.

FIG. 1 shows an application of gas-filled cylinders 10 according to the invention, in a damping device 1 with single manifold.

The gas-filled cylinder 10 comprises:
a tubular jacket 11, closed at a first end by an annular head portion 12, a rod 13 with a piston 14 which translates inside the jacket 11 through the head portion 12, with the piston 14 directed toward the inside of the jacket 11, one or more sealing elements 16 between the piston 14 and the internal surface 15 of the jacket 11.

The jacket 11 and the piston 14 define a portion of an expansion/compression chamber 17 for the gas, not shown in the figures.

In particular, the damping device 1 with single manifold comprises a plate 2 which has a plurality of accommodation holes 3, in each one of which the jacket 11 of a respective gas-filled cylinder 10 is inserted/accommodated.

The plate 2 is provided internally with a manifold 4 which is fluidically connected to the jacket 11 of each cylinder 10.

Basically, the expansion/compression chamber 17 for the gas of the whole device 1 is delimited by the respective portion in each cylinder 10 that is defined by the corresponding jacket 11 and corresponding piston 14, and by the manifold 4.

One of the peculiarities of the invention consists in that the cylinder 10 has at least one safety hole 18 on the internal surface 15 of the jacket 11.

The safety hole 18 is located beyond the nominal stroke limit of the piston 14 in the configuration of retraction of the rod 13 inside the jacket 11.

In the present description, the term "stroke limit" means the final level that can be reached by the piston 14 during its travel when the rod 13 translates.

The term "nominal stroke limit" in the present description means the design stroke limit, i.e. the stroke limit calculated for the specific cylinder 10 in its particular application of use in order to ensure the correct operation of the cylinder 10 and/or of the device 1.

In particular, the safety hole 18 is a through hole and has an axis of extension that is perpendicular to the axis of translation of the rod 13.

The piston 14 has:
a wider first portion 19, proximate to the rod 13, with a diameter that is substantially equal to the inside diameter of the jacket 11,
a second portion 20, directed toward the chamber 17, with a diameter that is smaller than the diameter of the first portion 19.

An annular piston-guide element 21 is placed around the first portion 19 of the piston 14, between the first portion 19 and the internal surface 15 of the jacket 11, and is adapted to keep the axis of translation of the piston 14 coaxial with the axis of the cylinder 11.

Specifically, the piston-guide element 21 is inserted into a special seat provided in the piston 14, in the first portion 19 of the latter.

Similarly, an annular rod-guide element 23 is placed around the rod 13, at the head portion 12 of the jacket 11, and is adapted to keep the axis of translation of the rod 13 coaxial with the axis of the cylinder 11.

Specifically, the rod-guide element 23 is inserted into a special seat provided in the head portion 12 of the jacket 11.

An annular sealing element 16 is placed around the second portion 20 of the piston 14, and between the piston 14 and the internal surface 15 of the jacket 11, and ensures the seal of the gas inside the chamber 17.

In particular, the sealing element 16, made of plastic material, is shaped so as to have two side-by-side annular lips which are directed toward the chamber 17:

a first lip 22a in contact with the piston 14, a second lip 22b, which is substantially parallel to the first lip 22a, in contact with the internal surface 15 of the jacket 11.

Figure 5:
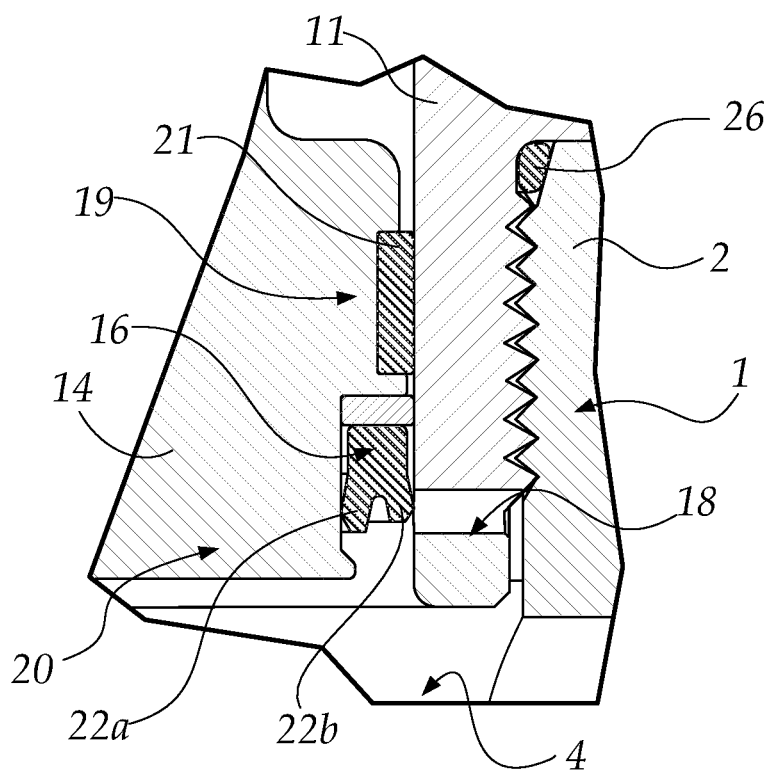
FIG. 5 is a cross-sectional enlarged detail view of the gas-filled cylinder of FIG. 4b.

With particular reference to FIG. 5, the first lip 22a has an extension, in the direction of the chamber 17, which is greater than the extension of the second lip 22b.

In other embodiments, not shown in the figures, the two lips 22a, 22b, of the sealing element 16 have the same extension in the direction of the chamber 17.

The operation of the cylinder 10, according to the invention, is as follows.

In the event of overtravel of the rod 13, as shown in FIGS. 4b and 5, the piston 14 will travel past the stroke limit, beyond which the safety hole 18 is located.

When the second lip 22b enters the safety hole 18, the sealing element 16 deforms, partly as a result of the different extension of the two lips 22a, 22b, and it is no longer capable of ensuring the seal of the gas, which is discharged in the direction of the rod 13, around it, in so doing exiting from the cylinder 10.

Therefore the hole 18, reached by the sealing element 16 in the event of overtravel, produces the discharge of the gas.

This avoids the risk of overpressure inside the cylinder and/or the device 1, and any bad consequences.

The jacket 11 has, proximate to/at the head portion 12, on the external lateral surface, facets 24 that are adapted to facilitate the screwing/unscrewing of the cylinder 10 to/from the plate 2 of the device 1, using an adapted tool.

The jacket 11 has, at the opposite end with respect to the end provided with the head portion 12, a tubular portion 25, with a reduced outside diameter that is substantially smaller than the outside diameter of the rest of the jacket 11.

Such tubular portion 25 has, on the external lateral surface, a threaded region, indicated with 27 in the figures, which is adapted to be screwed into the complementarily-threaded internal surface of an accommodation hole 3 in the plate 2 of the device 1.

An O-ring 26 is arranged around the tubular portion 25 at the connecting region between the latter and the rest of the jacket 11.

In particular, the safety hole 18 is arranged at the tubular portion 25, outside the threaded region 27, in a sector that is opposite with respect to the region in which the O-ring 26 is located.

On the jacket 11, at the threaded region 27, there is a groove 28 which extends starting from the safety hole 18 toward the O-ring 26, with an axis of extension that is parallel to the axis of extension of the cylinder 10.

Such groove 28 is adapted to discharge the gas contained in the device 1, in the event the cylinder 10 involuntarily comes unscrewed from the device under pressure. Once the seal of the O-ring 26 is disengaged, the gas begins to exit.

In other embodiments, not shown in the figures, the cylinder has multiple safety holes.

In practice it has been found that the invention fully achieves the intended aim and objects by providing a gas-filled cylinder, particularly for a damping device with single manifold, which has an overtravel safety device.

With the invention a gas-filled cylinder, particularly for a damping device with single manifold, has been devised which allows a rapid discharge of the gas in the event of overtravel without causing explosions and/or injury to persons or damage to equipment in the vicinity.

With the invention a gas-filled cylinder has been provided, with an overtravel safety device that produces the discharge of the gas, thus ruling out the risk of breakage of the parts in the event of overtravel.

The invention thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102020000024685 from which this application claims priority are incorporated herein by reference.

What is claimed is:

1. A gas-filled cylinder for a damping device with single manifold, said cylinder comprising:
    a tubular jacket, closed at one end by an annular head portion wherein the tubular jacket has an open end opposite the annular head portion, wherein said open end is capable of coupling to the manifold of the damping device, wherein a tubular portion extends from the tubular jacket, wherein the open end is proximate the tubular portion and wherein the tubular portion has a threaded region on an external lateral surface,
    a rod with a piston which translates inside said jacket through said head portion, said piston being directed toward an inside of said jacket, said jacket and said piston defining a portion of an expansion/compression chamber for said gas,
    at least one sealing element between said piston and an internal surface of said jacket,
    said cylinder having at least one safety hole on said internal surface of said jacket, wherein said at least one safety hole is a through hole and has an axis of extension that is perpendicular to an axis of translation of said rod.

2. The cylinder according to claim 1, wherein said at least one safety hole is in a position spaced from a nominal stroke limit of said piston in a configuration of retraction of said rod inside said jacket.

3. The cylinder according to claim 1, wherein said piston has:
    a wider first portion, proximate to said rod, with a diameter that is substantially equal to an inside diameter of said jacket,
    a second portion, directed toward said portion of the expansion/compression chamber portion, with a diameter that is smaller than a diameter of said first portion.

4. The cylinder according to claim 3, wherein said at least one sealing element is annular and is arranged around said second portion of said piston and between said piston and said internal surface of said jacket.

5. The cylinder according to claim 1, wherein said at least one sealing element is shaped so as to have two side-by-side annular lips which are directed toward said portion of the expansion/compression chamber:
    a first lip in contact with said piston,
    a second lip, which is substantially parallel to said first lip, in contact with said internal surface of said jacket.

6. The cylinder according to claim 5, wherein said first lip has an extension, in the direction of said expansion/compression chamber, which is greater than the extension of said second lip.

7. The cylinder according to claim 1, wherein said jacket has facets proximate to/at said head portion, on the external lateral surface.

8. The cylinder according to claim 1, wherein said jacket has, at the opposite end with respect to an end provided with said head portion, the tubular portion, with a reduced outside diameter that is substantially smaller than an outside diameter of the rest of said jacket.

9. The cylinder according to claim 8, wherein an O-ring is arranged around said tubular portion at a connecting region between said tubular portion and the rest of said jacket.

10. The cylinder according to claim 9, wherein said at least one safety hole is arranged at said tubular portion, in a sector that is opposite from a region in which said O-ring is located.

11. The cylinder according to claim 9, wherein on said jacket, at said threaded region, there is a groove which extends starting from said at least one safety hole toward said O-ring, with an axis of extension that is parallel to the axis of extension of said cylinder.

12. The cylinder according to claim 1 wherein the tubular portion has an outside diameter that is smaller than the outside diameter of the tubular jacket.

* * * * *